United States Patent
Umeoka et al.

(10) Patent No.: US 7,451,609 B2
(45) Date of Patent: Nov. 18, 2008

(54) METHOD OF CONTROLLING COMPRESSOR AND CONTROLLER

(75) Inventors: Ikutomo Umeoka, Fujisawa (JP); Makoto Katayama, Chigasaki (JP); Junichiro Yabiki, Chigasaki (JP)

(73) Assignee: Panasonic Corporation, Osaka (JP)

( * ) Notice: Subject to any disclaimer, the term of this patent is extended or adjusted under 35 U.S.C. 154(b) by 812 days.

(21) Appl. No.: 10/518,029

(22) PCT Filed: May 21, 2004

(86) PCT No.: PCT/JP2004/007297

§ 371 (c)(1),
(2), (4) Date: Dec. 15, 2004

(87) PCT Pub. No.: WO2004/106820

PCT Pub. Date: Dec. 9, 2004

(65) Prior Publication Data

US 2005/0252224 A1 Nov. 17, 2005

(30) Foreign Application Priority Data

May 28, 2003 (JP) .............................. 2003-150665

(51) Int. Cl.
- *F25B 1/00* (2006.01)
- *F25B 49/00* (2006.01)
- *G05D 23/32* (2006.01)
- *H02P 1/16* (2006.01)
- *H02P 23/00* (2006.01)

(52) U.S. Cl. ...................... 62/228.1; 62/158; 318/778; 318/808

(58) Field of Classification Search ................... 62/115, 62/158, 160, 193, 228.1, 228.4; 318/778, 318/808; 417/45, 42
See application file for complete search history.

(56) References Cited

U.S. PATENT DOCUMENTS

| | | | |
|---|---|---|---|
| 5,074,120 A | 12/1991 | Kitamoto | 62/156 |
| 5,323,619 A | 6/1994 | Kim | 62/160 |
| 6,206,643 B1 | 3/2001 | Jeong | 417/45 |
| 6,218,753 B1 | 4/2001 | Asano et al. | 310/156 |

FOREIGN PATENT DOCUMENTS

| | | |
|---|---|---|
| EP | 0 622 445 A1 | 11/1994 |
| EP | 0 940 641 A2 | 9/1999 |
| EP | 0 940 641 A3 | 2/2001 |
| EP | 1193305 A1 * | 4/2002 |
| JP | 60-36794 | 2/1985 |
| JP | 2-13748 | 1/1990 |
| JP | 11-230627 | 8/1999 |
| JP | 11-241846 | 9/1999 |

(Continued)

*Primary Examiner*—Chen-Wen Jiang
(74) *Attorney, Agent, or Firm*—Steptoe & Johnson LLP (57) ABSTRACT

A compressor is operable to compress refrigerant at a variable operation frequency. According to a method of controlling the compressor, the compressor starts operating, and just after that, the compressor operates at a first frequency for a first period of time. Just after that, the compressor operates at a second frequency lower than the first frequency for a second period of time longer than the first period, and after that, the compressor operates at an ordinary operation. This method does not cause the compressor to generate an abnormal noise or obstruction to lubrication.

40 Claims, 13 Drawing Sheets

FOREIGN PATENT DOCUMENTS

| | | |
|---|---|---|
| JP | 11-248228 | 9/1999 |
| JP | 11-311186 | 11/1999 |
| JP | 11-311457 | 11/1999 |
| JP | 2000-266444 | 9/2000 |
| JP | 2002-81770 | 3/2002 |

* cited by examiner

PRIOR ART

METHOD OF CONTROLLING COMPRESSOR AND CONTROLLER

TECHNICAL FIELD

The present invention relates to a method of controlling a refrigerant compressor used in refrigerating devices, such as a refrigerator, an air-conditioner, and a refrigerator with a freezer, and to a controller for controlling the compressor.

BACKGROUND ART

Compressors of refrigerating devices, such as a domestic refrigerator with a freezer, recently employ hydrocarbon refrigerant, such as R600a, which is a natural refrigerant having an ozone depleting coefficient of zero and a small global warming coefficient.

A conventional compressor disclosed in Japanese Patent Laid-Open Publication No. 11-311457 rotates at a low frequency at its start at a low ambient temperature, at which a large amount of refrigerant dissolves in lubricant. At the start, the lubricant is discharged while bubbles generated by vaporization of the refrigerant are sucked. When the compressor rotates at a constant frequency, a discharged amount of the lubricant decreases. As a result, an amount of the lubricant in the compressor is maintained, and this prevents lack of the lubricant supplied to sliding components.

Figure 10:
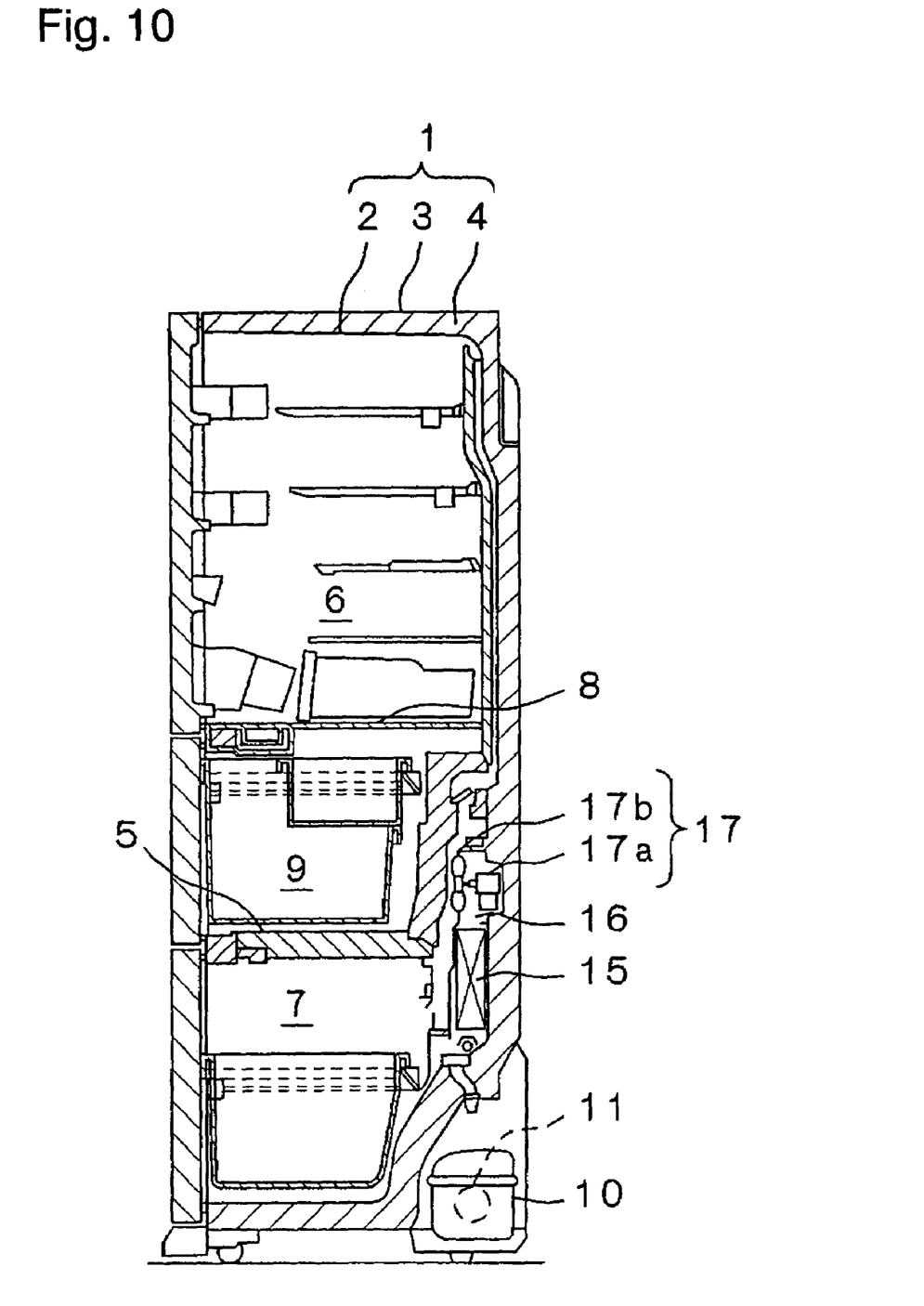
FIG. 10 shows a sectional view of a conventional refrigerator.
Figure 11:
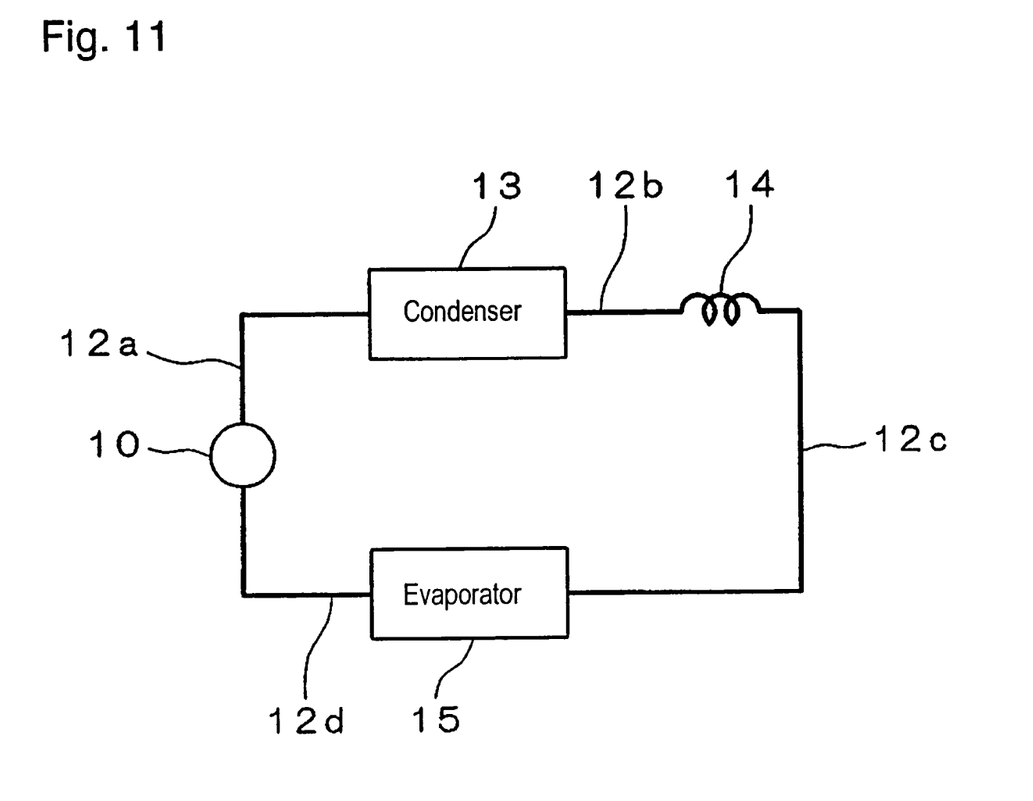
FIG. 11 shows a conventional refrigerating cycle.
Figure 12:
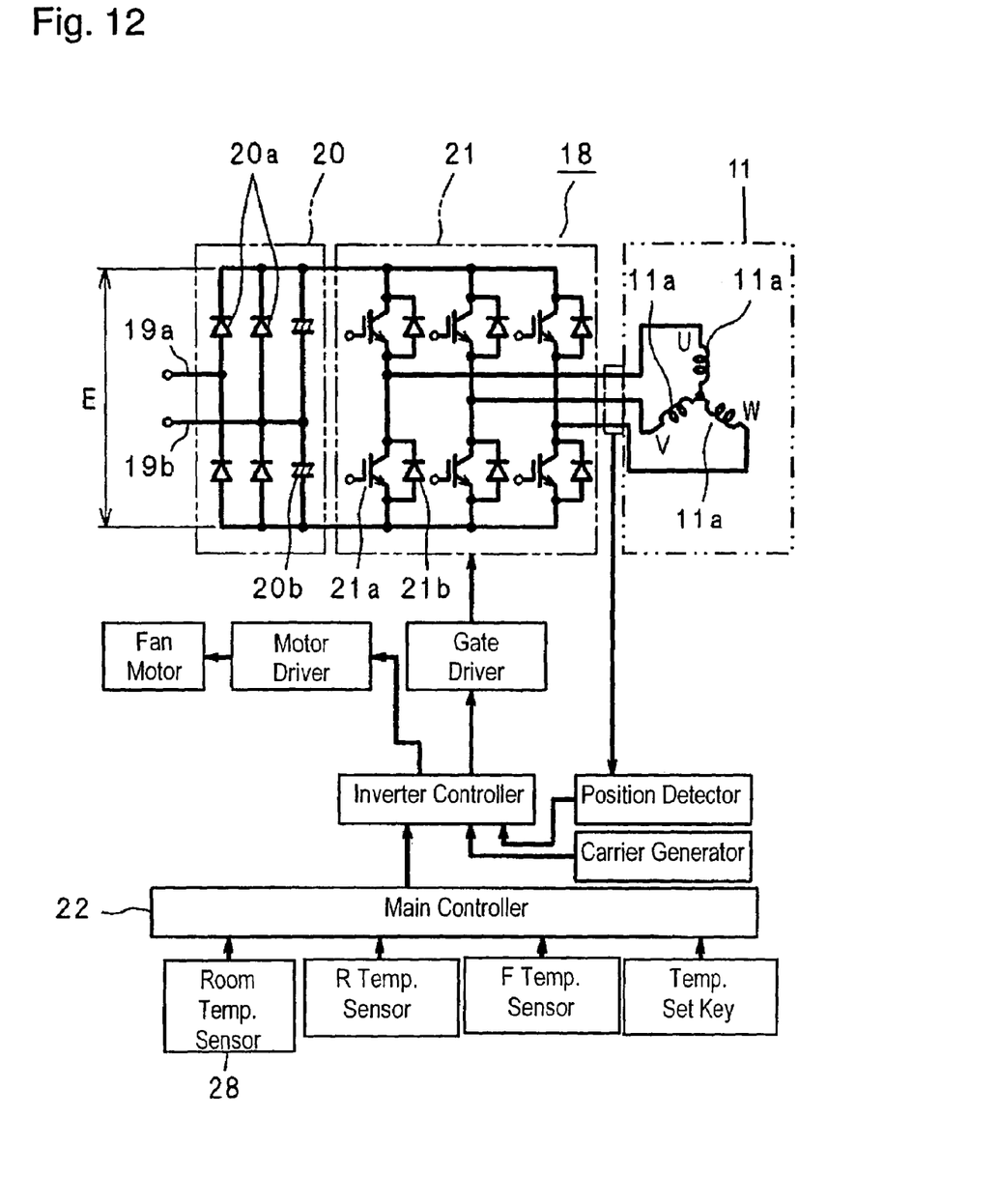
FIG. 12 shows an electrical schematic diagram of the conventional refrigerator.
Figure 13:
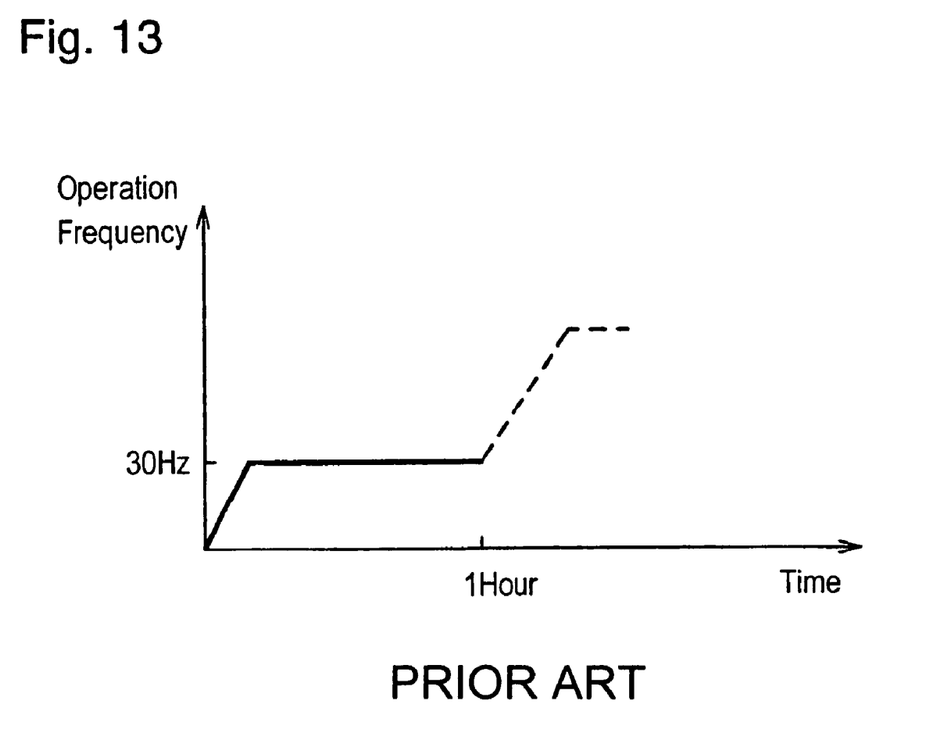
FIG. 13 shows operating frequencies of a conventional compressor.

A controller of controlling the conventional compressor will be described hereinafter. FIG. 10 is a sectional view of a conventional refrigerator. FIG. 11 shows a refrigerating cycle of the conventional refrigerator. FIG. 12 is an electrical schematic diagram of the conventional refrigerator. FIG. 13 shows a change of an operating frequency of the conventional compressor.

As shown in FIG. 10, reciprocating compressor 10 is placed at the lower and rear section in refrigerator 1. The reciprocating compressor includes lubricant, motor 11, and a mechanism driven by motor 11. Those elements are accommodated in an airtight container. Compressor 10 includes a lubricating mechanism (not shown) formed of a centrifugal pump therein. The airtight container accommodates compressor motor 11, a crank mechanism (not shown), and a piston (not shown). A rotary shaft of motor 11 is linked to the piston via the crank mechanism which converts a torque of motor 11 into a linear reciprocating force and transmits the force to the piston. Refrigerant in the airtight container is compressed by the reciprocating force of the piston.

As shown in FIG. 11, compressor 10 is coupled to condenser 13 via pipe 12a. Condenser 13 is coupled to capillary tube 14 via pipe 12b. Capillary tube 14 is coupled to evaporator 15 via pipe 12c. Evaporator 15 is coupled to a suction inlet of compressor 10 via pipe 12d. The foregoing structure forms refrigerating cycle 16 having refrigerant sealed therein.

As shown in FIG. 12, motor 11 is a three-phase DC brushless motor including a stator formed of a stator core having coils 11a of phases U, V and W wound around the core, and a rotor formed of a rotor core and permanent magnets rigidly mounted to the rotor core. Motor 11 is coupled to inverter 18 shown in FIG. 12.

Inverter 18 includes main controller 22 implemented mainly by a micro-computer. Main controller 22 determines an operating frequency of motor 11 in response to an electrical signal corresponding to room temperature T. The electrical signal is supplied from room-temperature sensor 28, such as a thermister, placed at refrigerator 1.

An operation of the controller of the refrigerant compressor will be described hereinafter. Upon inverter 18 outputting a power at a predetermined frequency to motor 11, compressor 10 compresses the refrigerant, then the refrigerant discharged from compressor 10 circulates through condenser 13, capillary tube 14, and evaporator 15 in this order.

A large amount of refrigerant generally dissolves into lubricant in compressor 10 at a low ambient temperature. At this moment, if compressor 10 is activated at a high frequency, the dissolving refrigerant evaporates at once, thereby producing bubbles intensely.

In order to prevent the bubbles from being produced, when main controller 22 of inverter 18 detects the relation of reference temperature T0≧ambient temperature T, the controller raises the frequency of the power applied to motor 11 from 0 Hz (the motor halts) to 30 Hz, which is a minimum frequency, within about 3 seconds, then holds the frequency at 30 Hz. This operation allows the refrigerant dissolving in the lubricant to evaporate gradually, hence preventing the bubbles from being intensely produced. Then, the lubricant is prevented from being discharged from compressor 10 together with the refrigerant, and the lack of lubrication can be prevented.

However, when compressor 10 operates at the minimum frequency (30 Hz) at a low ambient temperature, in the conventional controller, the refrigerant dissolving in the lubricant evaporate little. Therefore, at low ambient temperature at which the large amount of the refrigerant dissolves in the lubricant, when the compressor operates from the frequency of 30 Hz to an ordinary operation at a high rotation speed, a large amount of the refrigerant evaporates at once, hence producing the bubbles intensely. Compressor 10 then compresses the refrigerant together with the bubbles including a large amount of lubricant, thereby generating an abnormal noise. Simultaneously to this, an amount of lubricant is discharged from compressor 10, and then, a lack of lubrication and an obstacle to lubrication occur in compressor 10.

It has taken a long period of time for the refrigerant to dissolve in the lubricant. Therefore, the above phenomenon often occurs at an initial starting, i.e., when a refrigerating device is energized for the first time. This phenomenon often occurs at a start after a defrosting operation since the refrigerant in condensed form returns into compressor 10 from evaporator 15.

For a combination of hydrocarbon refrigerant, such as R600a, recently introduced and lubricant made from mineral oil, a saturation solubility of the refrigerant to the lubricant depends extremely on a pressure. At the start of the compressor, the pressure in the airtight container is reduced, hence producing the bubble intensely.

SUMMARY OF THE INVENTION

A compressor is operable to compress refrigerant at a variable operation frequency. According to a method of controlling the compressor, the compressor starts operating, and just after that, the compressor operates at a first frequency for a first period of time. Just after that, the compressor operates at a second frequency lower than the first frequency for a second period of time longer than the first period of time, and after that, the compressor operates at an ordinary operation.

This method does not cause the compressor to generate an abnormal noise or obstruction to lubrication.

DETAILED DESCRIPTION OF THE PREFERRED EMBODIMENTS

Exemplary Embodiment 1

Figure 1:
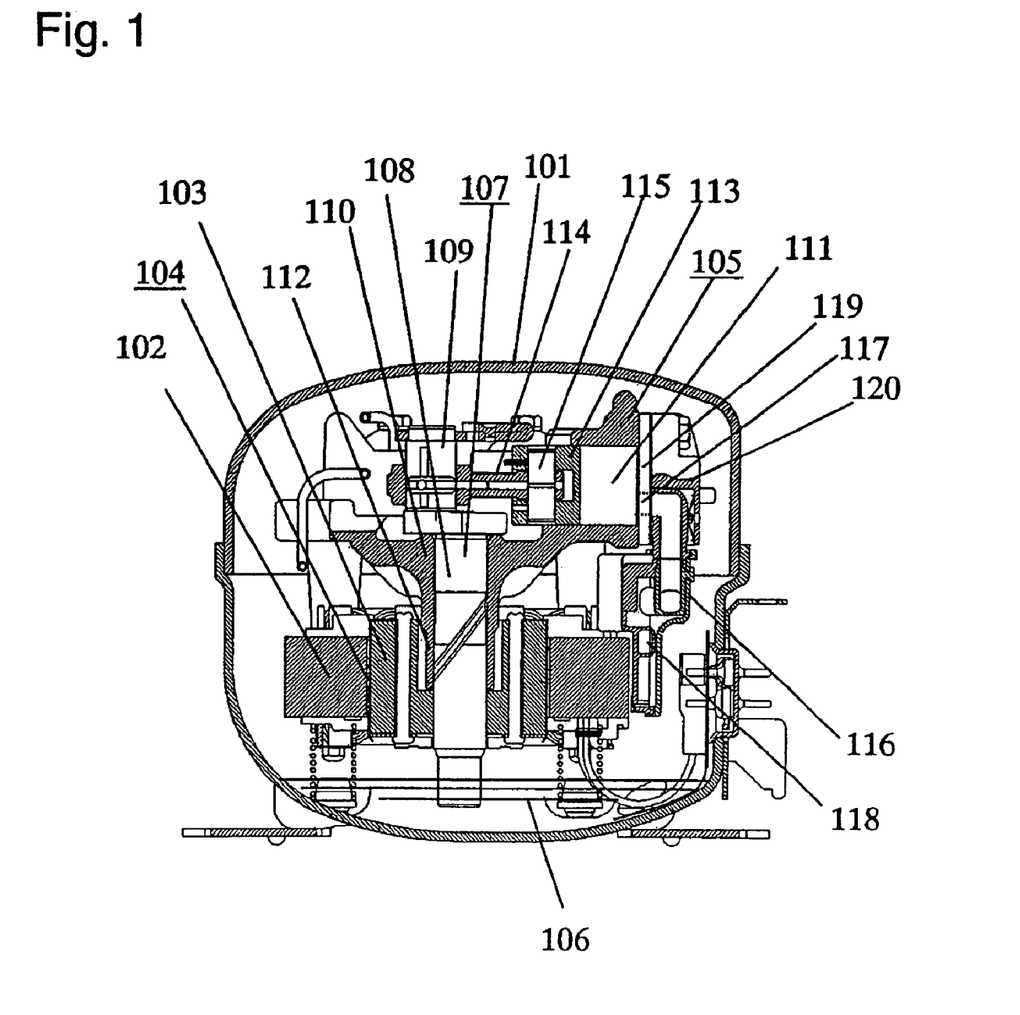
FIG. 1 is a vertical sectional view of a refrigerant compressor in accordance with Exemplary Embodiments 1 to 3 of the present invention.

FIG. 1 shows a vertical sectional view of a refrigerant compressor in accordance with Exemplary Embodiments 1 to 3 of the present invention. Refrigerant compressor 99 which can operate at a variable operation frequency contains hydrocarbon refrigerant, such as R600a, which does not include chlorine or fluorine. Airtight container 101 accommodates motor element 104 formed of stator 102 and rotor 103, and compressor element 105 driven by motor element 104.

Airtight container 101 stores lubricant 106 made from mineral oil which is highly soluble with the refrigerant. Crankshaft 107 includes a lubricating mechanism (not shown) therein. Crankshaft 107 includes main shaft 108 having rotor 103 press-fixed thereto and eccentric section 109 formed eccentrically with respect to main shaft 108. Crankshaft 107 is supported by cylinder block 110.

Cylinder block 110 forms compressing chamber 111 having substantially a cylindrical shape, and includes bearing 112 supporting main shaft 108. Piston 113 is inserted into compressing chamber 111 and can reciprocate in chamber 111. Piston 113 is coupled to eccentric section 109 via linking unit 114 and piston 115.

A suction pipe (not shown) is fixed to airtight container 101 and coupled to a lower pressure side (not shown) of a refrigerating system, thereby guiding the refrigerant into container 101. Suction muffler 116 has an end communicating with compressing chamber 111 via suction port 117. Suction inlet 118 opens in container 101 and fixed by being sandwiched between bulb-plate 119 and cylinder heat 120.

Figure 2:
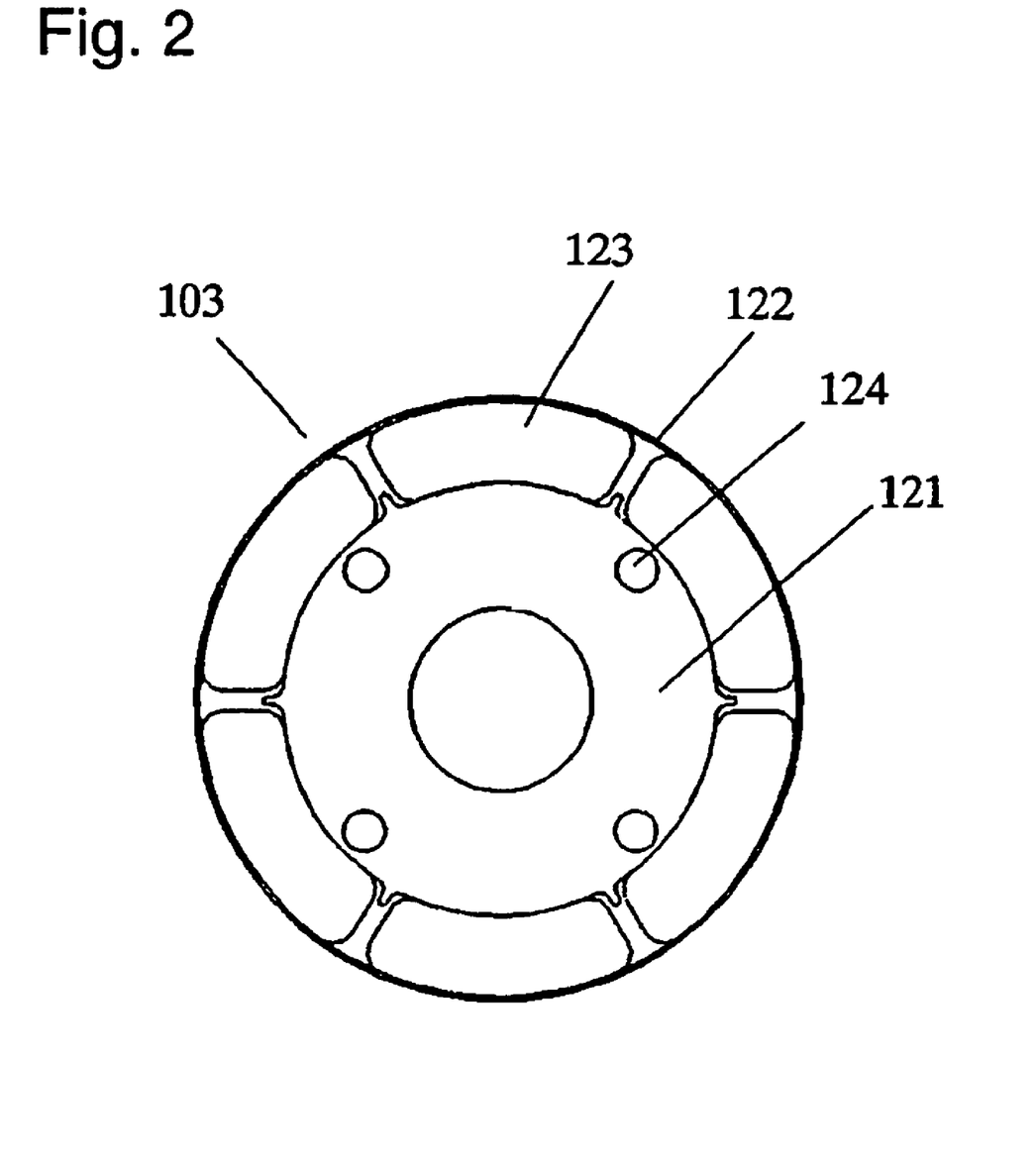
FIG. 2 is a top view of a rotor of the compressor in accordance with Embodiments 1 to 3.
Figure 3:
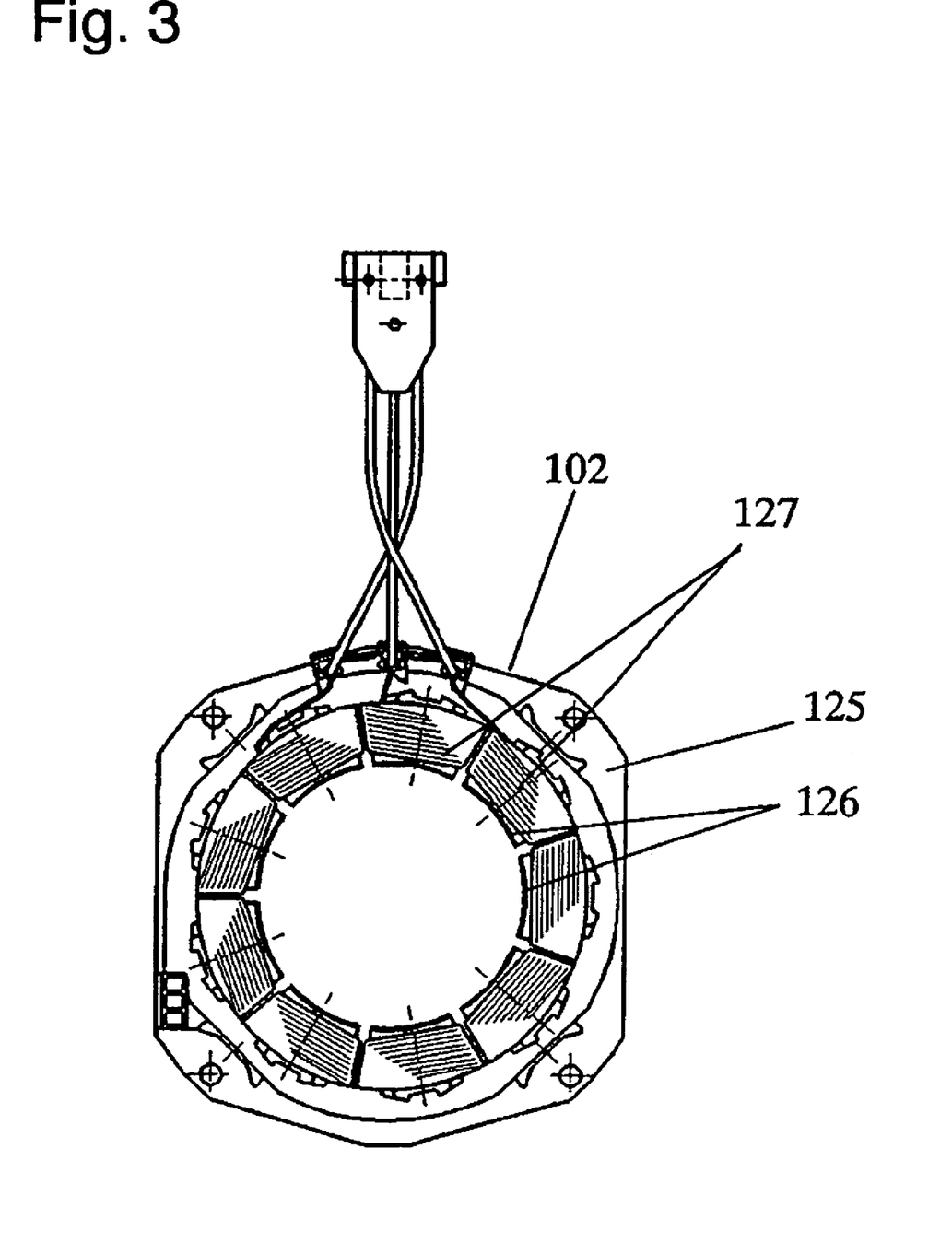
FIG. 3 is a top view of a stator of the compressor in accordance with Embodiments 1 to 3.

FIG. 2 shows a top view of rotor 103 of compressor 99, and FIG. 3 shows a top view of stator 102 of compressor 99. Rotor 103 includes rotor core 121, cylindrical pipes 122, and permanent magnets 123 embedded between core 121 and pipes 122. A lid (not shown) is fixed to core 121 with rivets 124. Coil wires 127 are wound directly on teeth 126 of core 125, thereby providing stator 102. Lubricant 106 lubricates the foregoing elements of the compressor.

Figure 4:
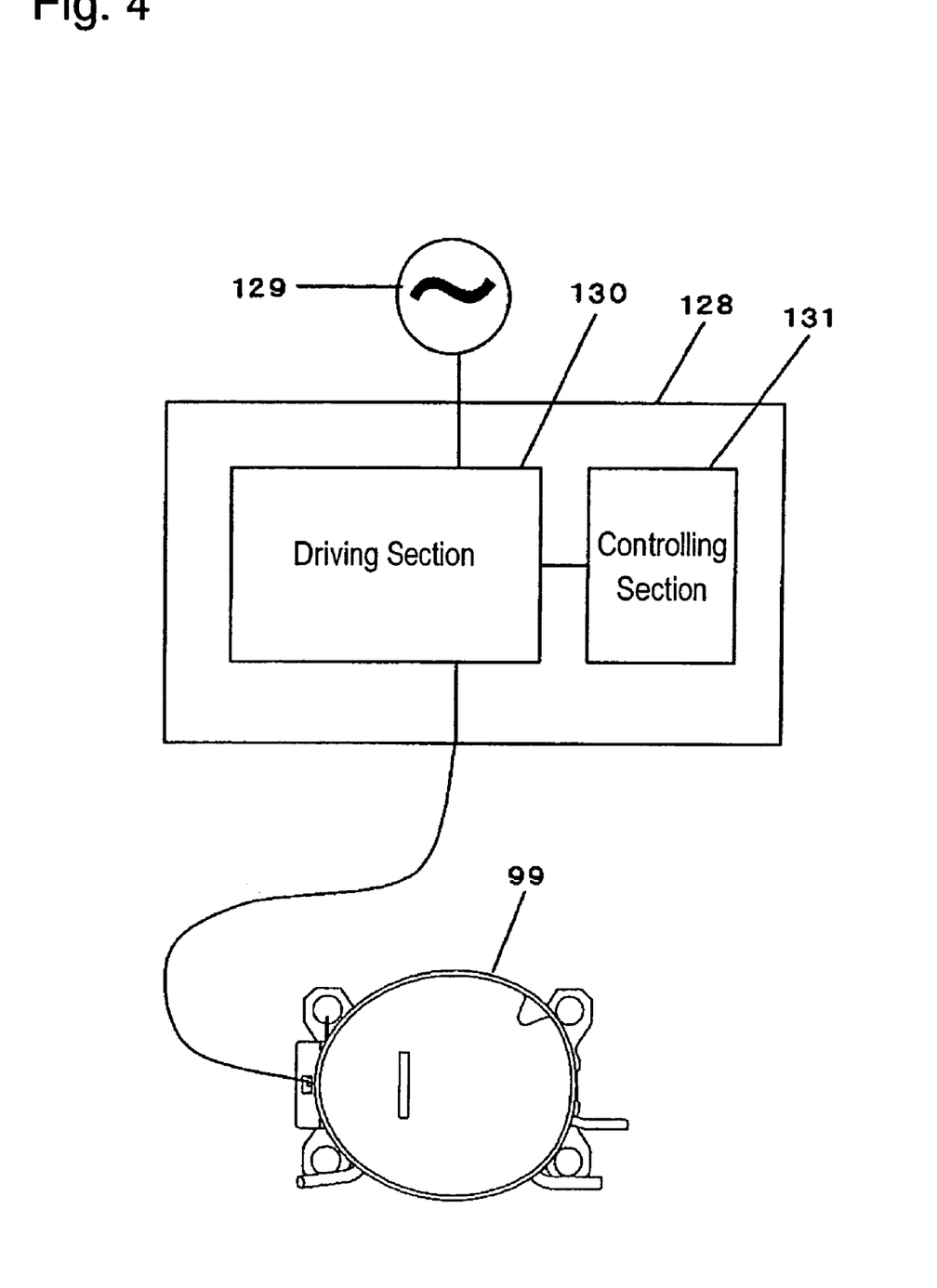
FIG. 4 is an operation controller of the compressor in accordance with Embodiments 1 to 3.

FIG. 4 shows controller 128 of compressor 99. Compressor 99 is coupled to power supply 129 via controller 128 including driving section 130 and controlling section 131. Driving section 130 drives motor element 104 of compressor 99, and controlling section 131 controls driving section 130, thereby controlling motor element 104 of compressor 99.

Figure 5:
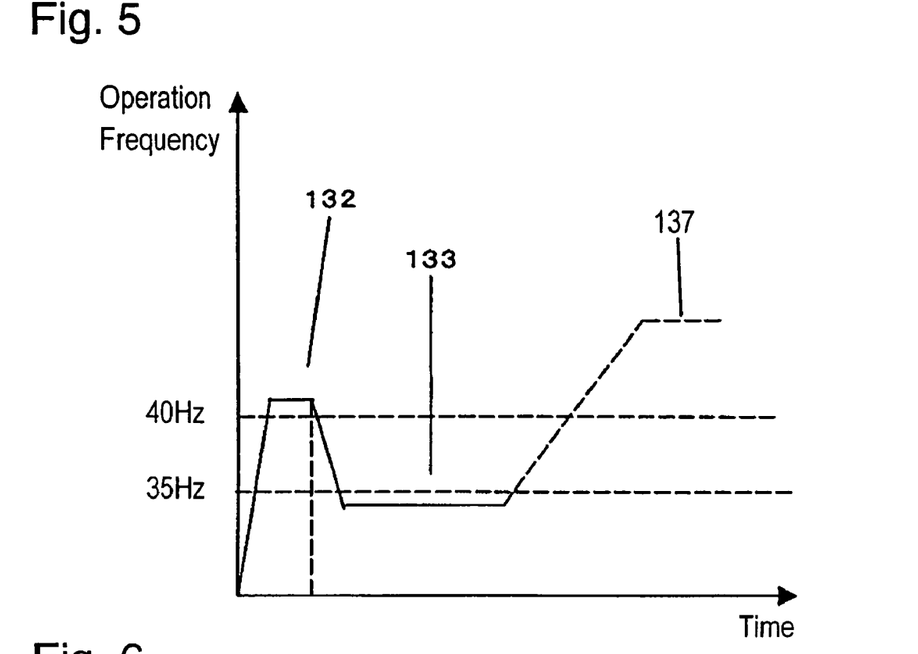
FIG. 5 shows operating frequencies at a start of the compressor in accordance with Embodiment 1.

Controller 128 controls an operation frequency of the compressor, as shown in FIG. 5 before an ordinary operation in which the compressor for compressing the refrigerant in the refrigerating device operates ordinarily, for example, when the refrigerating device is connected to a commercial power supply or when the refrigerating device is turned on for the first time after a defrosting operation. Compressor 99 is driven at a high speed at a frequency over 40 Hz at first within two seconds (high-speed operation 132). Then, the compressor is driven at a lower speed at a frequency not higher than 35 Hz (low-speed operation 133). A cycle consisting of the high-speed operation and the low-speed operation is repeated again, then controller 128 has compressor 99 operate at a rated operation frequency (rated operation 137, i.e., ordinary operation 137). At the start of the compressor, the refrigerating device is connected to the commercial power supply. Even if a large amount of the refrigerant dissolves into the lubricant in the compressor, the high-speed operation allows the refrigerant dissolving in the lubricant to evaporate, thereby preventing suction of bubbles. At another start of the compressor, i.e. the compressor is turned on for the first time after a defrosting operation, a large amount of liquid refrigerant returns from the refrigerating device to the compressor. Even if a large amount of the refrigerant dissolves in the lubricant, the high-speed operation allows the refrigerant dissolving in the lubricant to evaporate, thereby preventing the compressing chamber from having the bubbles sucked into it.

Motor element 104, upon receiving a current, activates compressor 99. Rotor 103 rotates crankshaft 107, and motion of eccentric section 109 is transmitted to piston 113 via linking unit 114, thereby having piston 113 reciprocate in compressing chamber 111. The refrigerant guided into airtight container 101 through the suction pipe is sucked with suction muffler 116. Then, a suction reed (not shown) opens to allow the refrigerant to flow through suction port 117. Then, the refrigerant is guided into compressing chamber 111 and is compressed continuously.

Figure 6:
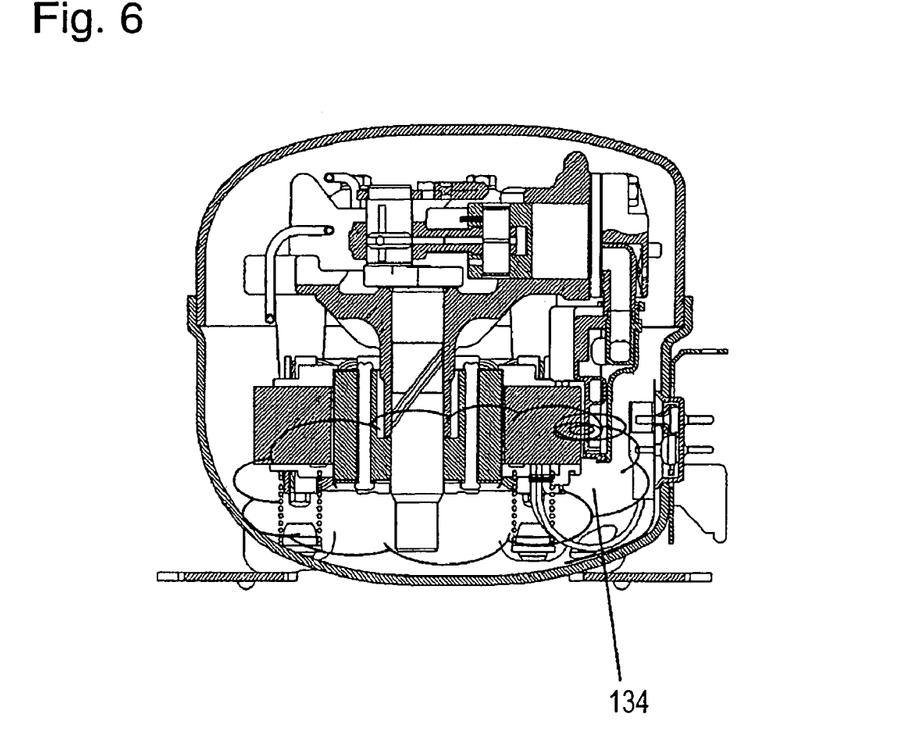
FIG. 6 shows a bubble phenomenon at the start of the compressor in accordance with Embodiments 1 to 3.

Just after compressor 99 starts operating at the frequency over 40 Hz (high-speed operation 132), a pressure in airtight container 101 is reduced. Further, lubricant 106 is agitated, which allows the refrigerant dissolving in lubricant 106 to evaporate, and bubbles 134 are produced, as shown in FIG. 6.

The refrigerant is hydrocarbon refrigerant excluding chlorine and fluorine, and lubricant 106 is made from mineral oil which is mutually soluble with the refrigerant. For a combination of this refrigerant and this lubricant, a saturation soluble amount of the refrigerant into lubricant 106 decreases rapidly according to decreasing of the pressure, so that the refrigerant evaporates intensely at once to produce the bubbles.

Since high-speed operation 132 is performed for a period of time limited within 2 seconds, controller 128 then drives compressor 99 at a frequency not higher than 35 Hz (change to low-speed operation 133) before bubbles 134 reach suction inlet 118 of suction muffler 116. The period of time of 2 seconds is the maximum allowable period of time before bubbles 134 reach suction inlet 118 at the fastest rising speed in the case of producing the most intense bubbles.

In other words, before bubbles 134 is sucked by suction muffler 116, controller 128 changes the operation of compressor 99 to low-speed operation 133 at a frequency not higher than 35 Hz. At low-speed operation 133, the pressure is reduced moderately, and lubricant 106 is not agitated so much, hence having bubbles 134 fall but not rise.

The cycle consisting of high-speed operation 132 and low-speed operation 133 is repeated before the ordinary operation, so that the refrigerant dissolving in lubricant 106 evaporates before bubbles 134 are sucked into compressing chamber 111, and the bubble phenomenon is suppressed to a small scale. Then, bubbles 134 fall, and then, compressor 99 is switched to operate at low-speed operation 133.

The refrigerant in lubricant 106 produces the bubbles and evaporates at high-speed operation 132, hence preventing an abnormal noise due to the compression of the lubricant. As a result, lubricant 106 is discharged little, so that an obstruction to lubrication caused by the lower oil surface can be prevented.

At low-speed operation 133, compressor 99 may stop, i.e. at an operating frequency of 0 Hz, hence minimizing the bubbles.

Suction inlet 118 provided at suction muffler 116 and opening into airtight container 101 allows bubbles 134 not to be guided directly to compressing chamber 111, but to be guided to chamber 111 through suction inlet 118 and suction muffler 116. Therefore, even if bubbles 134 are sucked into inlet 118, isolation of the lubricant and heat exchange in muffler 116 facilitates the evaporation of the refrigerant, hence suppressing the suction of foams 134 into chamber 111.

Motor element 104 includes rotor 103 having permanent magnets 123, and stator 102 having coil wires 127 wound directly on teeth 126 of stator core 125. Motor element 104 allows core 125 to be thin, and allows airtight container 101 to be small. As a result, the amount of lubricant 106 stored in container 101 is smaller by 25% than that in a motor element using a distributed winding. This reduction allows an amount of refrigerant dissolving in lubricant 106 to be smaller proportionately, thereby suppressing the bubbles.

Exemplary Embodiment 2

Figure 7:
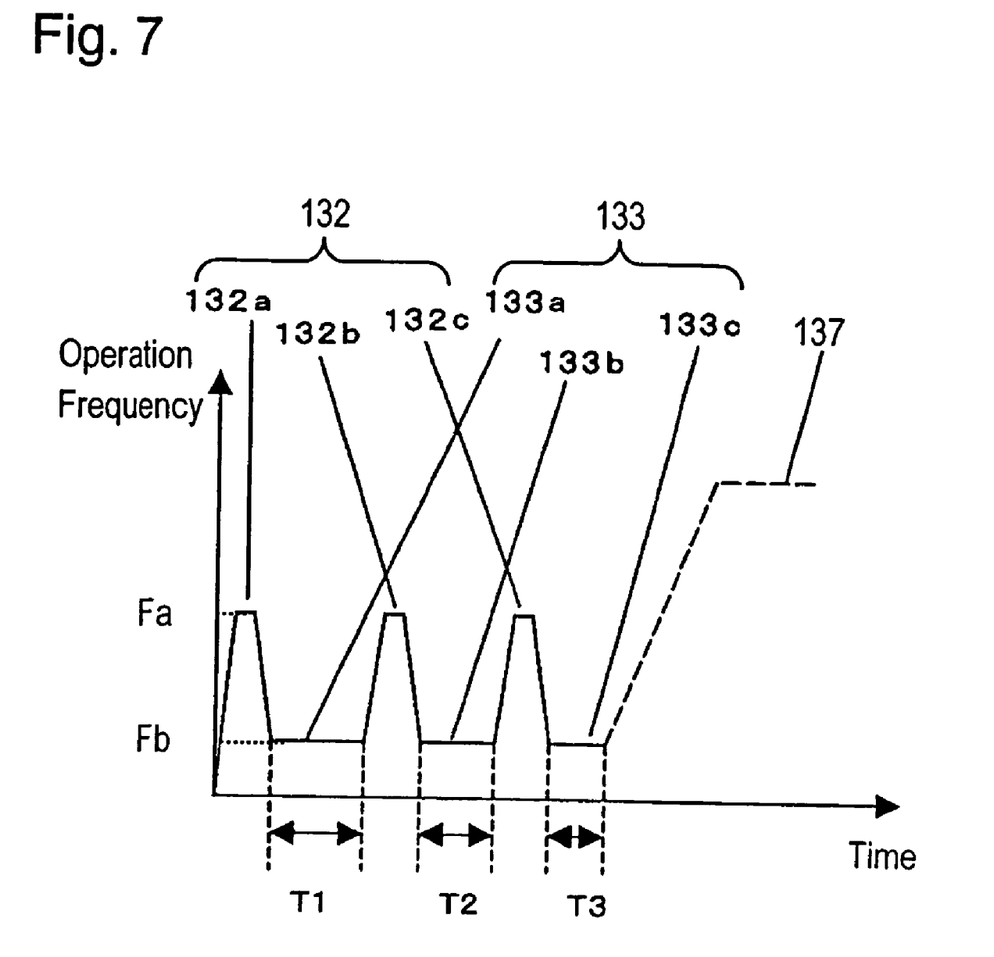
FIG. 7 shows operating frequencies at a start of the refrigerant compressor in accordance with Embodiment 2.

FIG. 7 shows operating frequencies at the start of a refrigerant compressor in accordance with Exemplary Embodiment 2 of the present invention. Similar elements to those of Embodiment 1 are denoted by the same reference numerals as those of Embodiment 1, and their detailed descriptions thereof are omitted here. As shown in FIG. 7, controller 128 drives refrigerant compressor 99 at frequency Fa (high-speed operation 132) before an ordinary operation in which the compressor for compressing refrigerant in a refrigerating device operates ordinarily, for example, when the refrigerating device is connected to a commercial power supply or when the device is turned on for the first time after a defrosting operation. Then controller 128 drives compressor 99 to operate at frequency Fb (low-speed operation 133) lower than frequency Fa. A cycle consisting of high-speed operation 132 and low-speed operation 133 is repeated plural times.

During high-speed operation 132a at frequency Fa, bubbles 134 are produced; however, the production of foams 134 is suppressed during low-speed operation 133a at frequency Fb. After low-speed operation 133a for period T1 of time, controller 128 drives compressor 99 to operate at frequency Fa (high-speed operation 132b). High-speed operation 132b allows the refrigerant still dissolving in lubricant 106 to evaporate.

Then, controller 128 drives compressor 99 to operate at frequency Fb (low-speed operation 133b) for period T2 of time shorter than period T1, so that the production of bubbles 134 is suppressed. The amount of bubbles 134 at low-speed operation 133b is less than the amount of bubbles 134 at low-speed operation 133a, hence allowing period T2 to be shorter than period Ti to suppress the production of bubbles 134.

Then, controller 128 drives compressor 99 to operate at frequency Fa (high-speed operation 132c), thereby allowing the refrigerant still remaining in lubricant 106 to evaporate completely. Then, controller 128 drives compressor 99 to operate at frequency Fb (low-speed operation 133c) for period T3 of time shorter than period T1 and period T2. Since high-speed operation 132c produces a fewer amount of bubbles 134, low-speed operation 133c for period T3 shorter than period T1 and period T2 is enough to suppress the production of bubbles 134.

If periods T1-T3 are shortened step by step, respective periods of low-speed operations 133a-133c can be shortened. As a result, the proportions of high-speed operations 132a-132c becomes greater, hence allowing the lubricant to be supplied to sliding components.

Compressor 99 operates at frequency Fa throughout high-speed operations 132a-132c. However, as long as frequency Fa is higher than frequency Fb at low-speed operations 133a-133c, and as long as operation periods of the high-speed operations are longer than periods T1-T3 of low-speed operations, effects similar to above are expected. At low-speed operations 133a-133c, the compressor may not be driven necessarily at common frequency Fb, but may be driven at respective frequencies at low-speed operations 133a-133c different from each other as long as the frequencies are lower than respective frequencies at high-speed operations 132a-132c.

Exemplary Embodiment 3

Figure 8:
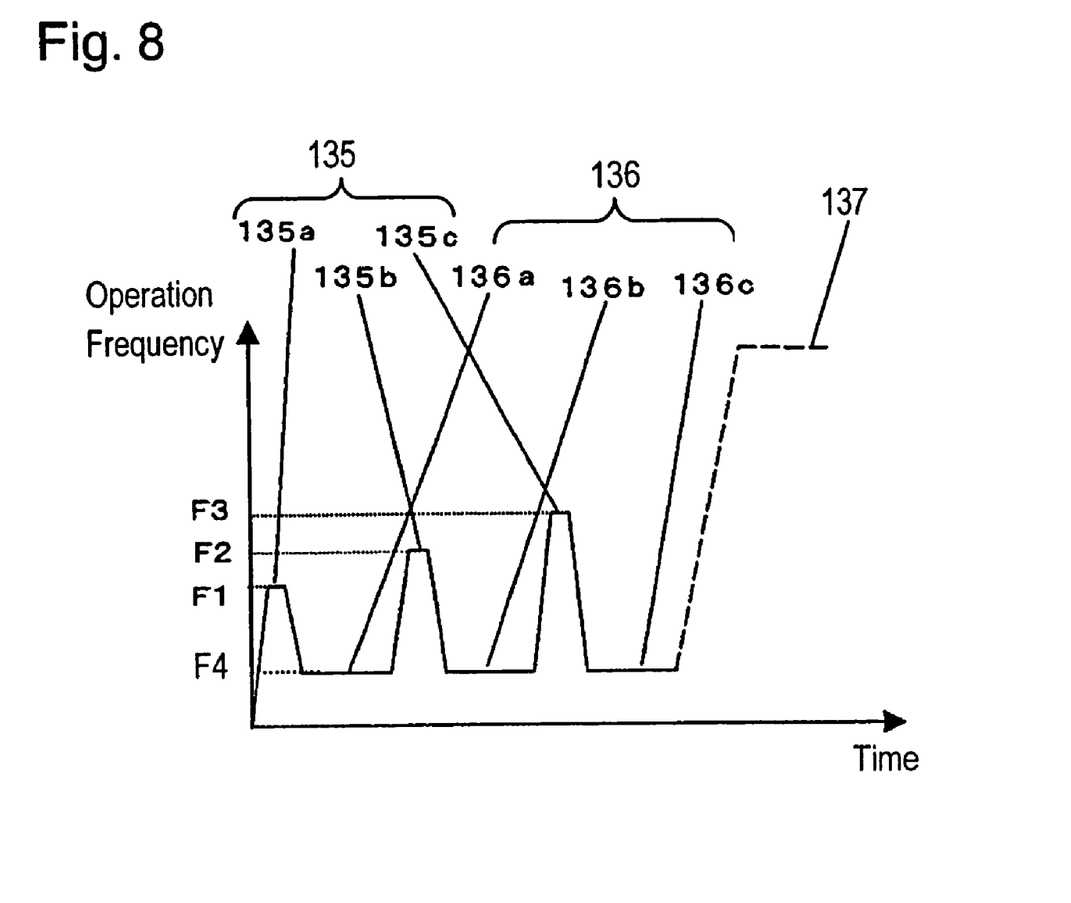
FIG. 8 shows operating frequencies at a start of the refrigerant compressor in accordance with Embodiment 3.

FIG. 8 shows operating frequencies used at the start of a refrigerant compressor in accordance with Exemplary Embodiment 3 of the present invention. Similar elements to those of Embodiment 1 are denoted by the same reference numerals as those of Embodiment 1, and detailed descriptions thereof are omitted.

As shown in FIG. 8, controller 128 drives refrigerant compressor 99 to operate at frequencies F1-F4 before an ordinary operation in which the compressor for compressing refrigerant in a refrigerating device operates ordinarily, for example, when the refrigerating device is connected to a commercial power supply or when the device is turned on for the first time after a defrosting operation. First, controller 128 drives compressor 99 to operate at frequency F1 (high-speed operation 135a), and then drive the compressor to operate at frequency F4 (low-speed operation 136a) lower than frequency F1. During high-speed operation 135a, bubbles 134 are produced. However the production of bubbles 134 is suppressed during low-speed operation 136a.

Then, controller 128 drives compressor 99 to operate at frequency F2 (high-speed operation 135b) higher than frequency F1, so that refrigerant still dissolving in lubricant 106 evaporates due to agitation and lowering of pressure. Then, controller 128 drives compressor 99 to operate at frequency F4 (low-speed operation 136b). The amount of bubbles 134 produced during low-speed operation 136b is smaller than that during high-speed operation 135a, so that the production of bubbles 134 can be sufficiently suppressed during low-speed operation 136b.

Next, controller 128 drives compressor 99 to operate at frequency F3 (high-speed operation 135c) higher than frequency F2, thereby allowing the refrigerant to still dissolve in lubricant 106 to evaporate completely. Then, controller 128 drives compressor 99 to operate at frequency F4 (low-speed operation 136c). The amount of bubbles 134 produced during high-speed operation 135c is smaller than that produced during high-speed operation 135b, so that the production of bubbles 134 can be sufficiently suppressed during low-speed operation 136c. Since an average frequency at high-speed operations 135a-135c becomes higher, the lubricant is supplied stably to sliding components.

Exemplary Embodiment 4

Figure 9A:
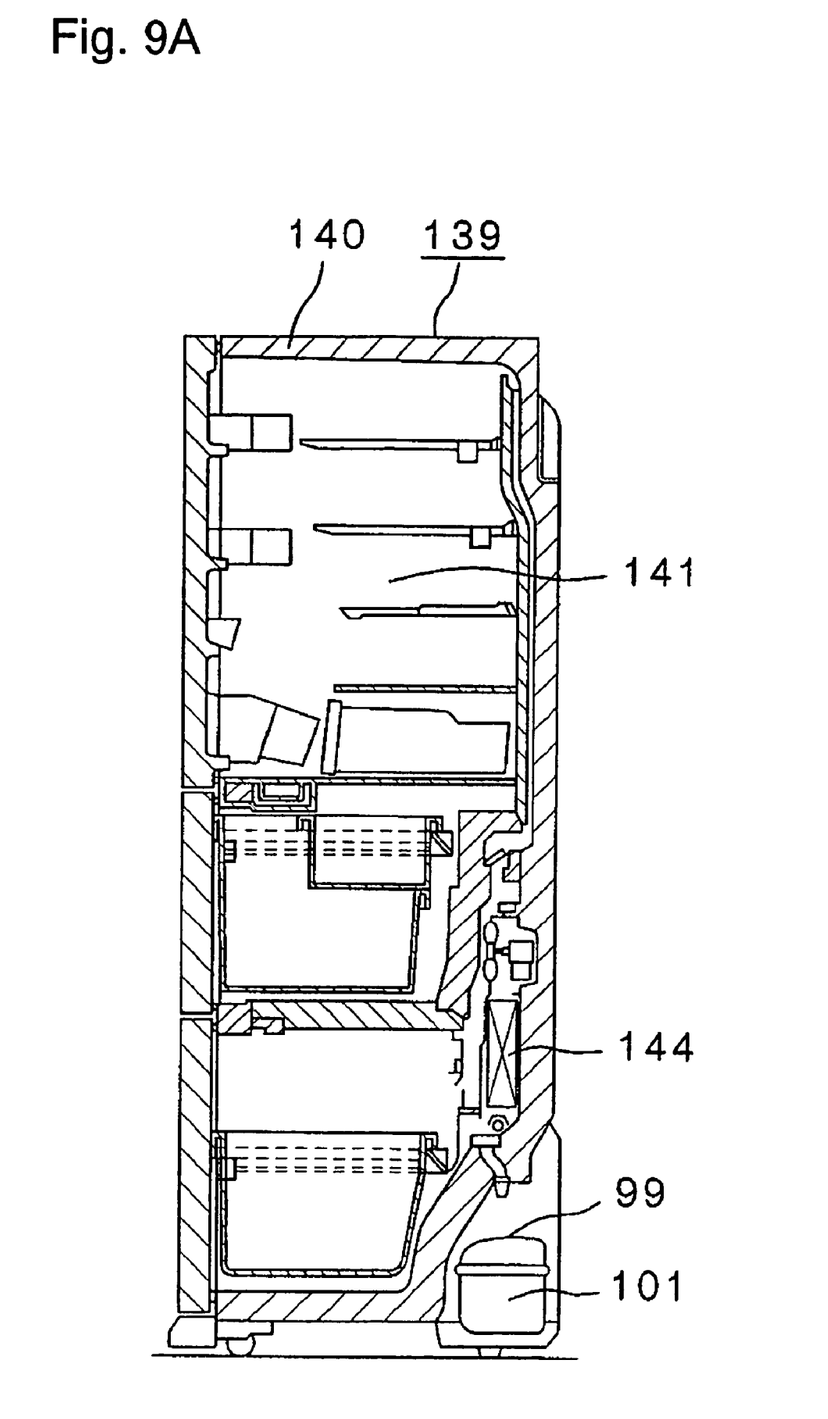
FIG. 9A shows a sectional view of a refrigerating device in accordance with Exemplary Embodiment of the invention.

FIG. 9A is a sectional view of a refrigerating device including a refrigerant compressor and a controller in accordance with Exemplary Embodiment 4 of the present invention. Similar elements to those of Embodiment 1 are denoted by the same reference numerals as those of Embodiment 1, and detailed descriptions thereof are omitted. Refrigerating device 139 includes storage compartment 141 surrounded by heat insulator 140, refrigerant compressor 99 placed at the bottom of the device, a condenser, a decompressor, and evaporator 144.

Figure 9B:
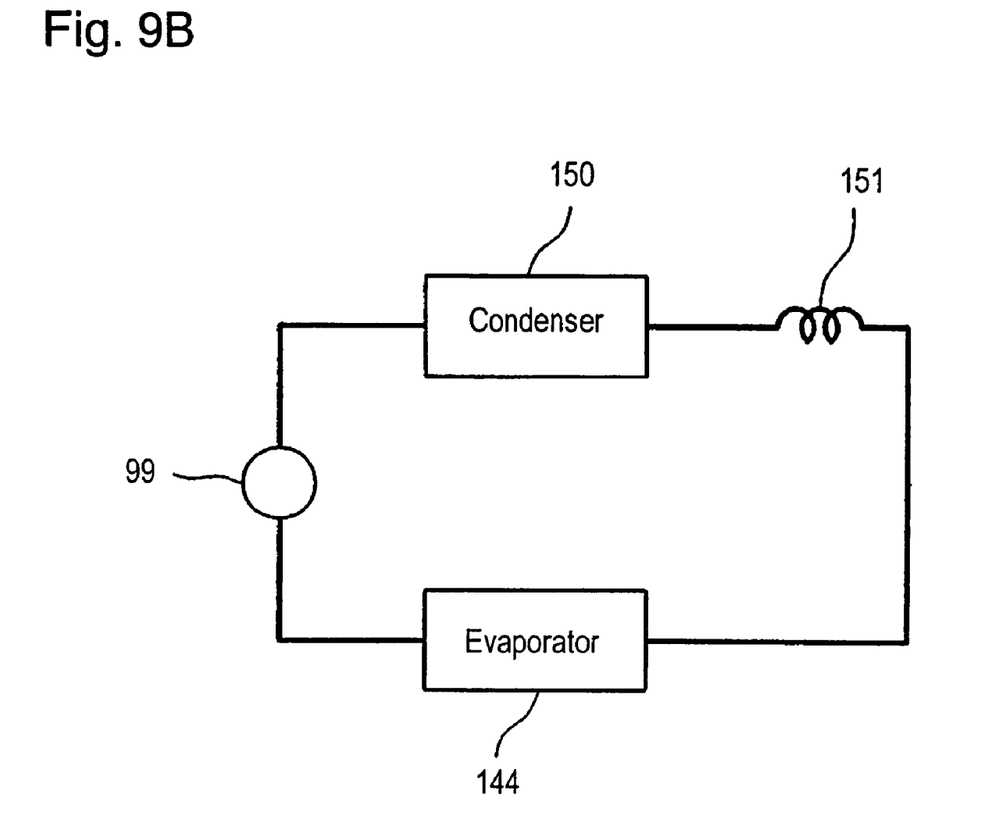
FIG. 9B shows a refrigerating cycle of the refrigerating device in accordance with Embodiment 4.

FIG. 9B shows a refrigerating cycle of the refrigerating device of Embodiment 4. Compressor 99, condenser 150, decompressor 151, and evaporator 144 are coupled to provide the refrigerating cycle. As shown in FIG. 1, compressor 99 includes lubricant 106, motor element 104 including stator 102 and rotor 103, and compressor element 105 in airtight container 101. Motor element 104 is controlled and driven by controller 128 according to Embodiment 1 shown in FIG. 1.

Compressor 99 prevents compressing chamber 111 from sucking bubbles 134 into the chamber, and allows refrigerant dissolving in lubricant 106 to evaporate sufficiently, thereby supplying the lubricant adequately to sliding components.

At each of high-speed operations 135a-135c, the compressor may operate for different periods of time. At each of low-speed operations 136a-136c, the compressor may operate not necessarily at common frequency F4. As long as respective frequencies of the low-speed operations are lower than frequencies F1-F3 of high-speed operations 135a-135c, the frequencies of the low-speed operation may be different from each other.

According to Embodiments 1 to 4, compressor 99 is the reciprocating compressor including the airtight container have a low pressure therein is described. However, compressor 99 may be a compressor other than the reciprocating compressor, i.e., a compressor including an airtight container having a high pressure therein, and the methods according to Embodiment 1 to 3 suppress bubbles produced in lubricant.

INDUSTRIAL APPLICABILITY

A method of controlling a compressor for compressing refrigerant at a variable operation frequency according to the present invention prevents an abnormal noise and an obstruction to lubrication.

REFERENCE NUMERALS

99 Compressor
101 Airtight Container
102 Stator
103 Rotator
104 Motor Element
105 Compressing Element
106 Lubricant
118 Inlet
126 Tooth
127 Coil Wire
128 Controller
129 Power Supply
130 Driving Section
131 Controlling Section
139 Refrigerating Device
144 Evaporator
150 Condenser
151 Decompressor

The invention claimed is:

1. A method of controlling a compressor for a refrigerant at a variable operation frequency, said method comprising the steps of:
   (a) starting the compressor;
   (b) operating the compressor at a first frequency for a first period of time immediately after said step (a);
   (c) operating the compressor at a second frequency lower than the first frequency for a second period of time longer than the first period immediately after said step (b); and
   (d) operating the compressor at an ordinary operation frequency after said step (c);
   wherein the first period of time is not longer than two seconds.

2. The method of claim 1, further comprising the steps of:
   (e) operating the compressor at a third frequency higher than the second frequency for a third period of time shorter than the second period immediately after said step (c); and
   (f) operating the compressor at a fourth frequency lower than the first frequency and the third frequency for a fourth period of time longer than the first period and the third period immediately after said step (e).

3. The method of claim 2, wherein the first frequency is equal to the third frequency.

4. The method of claim 2, wherein in the second frequency is equal to the fourth frequency.

5. The method of claim 2, wherein the first period is equal to the third period.

6. The method of claim 2, wherein the second period is equal to the fourth period.

7. The method of claim 2, wherein the fourth period is shorter than the second period.

8. The method of claim 2, wherein the third frequency is higher than the first frequency.

9. The method of claim 2, wherein the third period is not longer than two seconds.

10. The method of claim 2, wherein the third frequency is not lower than 40 Hz.

11. The method of claim 2, wherein the fourth frequency is not higher than 35 Hz.

12. The method of claim 1, wherein the first frequency is not lower than 40 Hz.

13. The method of claim 1, wherein the second frequency is not higher than 35 Hz.

14. The method of claim 1,
   wherein the compressor contains lubricant and the refrigerant, and
   wherein the refrigerant is hydrocarbon refrigerant excluding chlorine and fluorine, and the lubricant and the refrigerant are mutually soluble with each other.

15. A controller for controlling a compressor, comprising:
   a compressing element for compressing refrigerant, and
   a motor for driving the compressing element to operate at a variable operation frequency,
   said controller comprising:
   a driving section for driving the motor; and
   a controlling section for controlling the driving section, the controlling section for:
      (a) starting the compressor,
      (b) operating the compressor at a first frequency for a first period of time immediately after said step (a),
      (c) operating the compressor at a second frequency lower than the first frequency for a second period of time longer than the first period immediately after said step (b), and
      (d) operating the compressor at an ordinary operation frequency after said step (c)
   wherein the first period of time is not longer than two seconds.

16. The controller of claim 15, wherein the controlling section is further for:

(e) operating the compressor at a third frequency higher than the second frequency for a third period of time shorter than the second period immediately after said (c), and (f) operating the compressor at a fourth frequency lower than the first frequency and the third frequency for a fourth period of time longer than the first period and the third period immediately after said step (e).

17. The controller of claim 16, wherein the first frequency is equal to the third frequency.

18. The controller of claim 16, wherein the second frequency is equal to the fourth frequency.

19. The controller of claim 16, wherein the first period is equal to the third period.

20. The controller of claim 16, wherein the second period is equal to the fourth period.

21. The controller of claim 16, wherein the fourth period is shorter than the second period.

22. The controller of claim 16, wherein the third frequency is higher than the first frequency.

23. The controller of claim 15,
wherein the compressing element contains lubricant and the refrigerant, and
wherein the refrigerant is hydrocarbon refrigerant excluding chlorine and fluorine, and the lubricant and the refrigerant are mutually soluble with each other.

24. A compressor comprising:
an airtight container for accommodating refrigerant and lubricant;
a compressing element for compressing the refrigerant, the compressing element being lubricated by the lubricant;
a motor element for driving the compressing element to operate at a variable operation frequency;
a driving section for driving the motor element; and
a controlling section for controlling the driving section, the controlling section for:
  (a) starting the compressing element,
  (b) operating the compressing element at a first frequency for a first period of time immediately after step said (a),
  (c) operating the compressing element at a second frequency lower than the first frequency for a second period of time longer than the first period immediately after said step (b), and
  (d) operating the compressing element at an ordinary operation after said step (c),
  wherein the first period is not longer than two seconds.

25. The compressor of claim 24, wherein the controlling section is for:
  (e) operating the compressing element at a third frequency higher than the second frequency for a third period of time shorter than the second period immediately after said step (c), and
  (f) operating the compressing element at a fourth frequency lower than the first frequency and the third frequency for a fourth period of time longer than the first period and the third period immediately after said step (e).

26. The compressor of claim 25, wherein the first frequency is equal to the third frequency.

27. The compressor of claim 25, wherein the second frequency is equal to the fourth frequency.

28. The compressor of claim 25, wherein the first period is equal to the third period.

29. The compressor of claim 25, wherein the second period is equal to the fourth period.

30. The compressor of claim 25, wherein the fourth period is shorter than the second period.

31. The compressor of claim 25, wherein the third frequency is higher than the first frequency.

32. The compressor of claim 24, further comprising a suction inlet for sucking the refrigerant, the suction inlet opening in the airtight container.

33. The compressor of claim 24, wherein the motor element includes
a rotor having a permanent magnet, and
a stator having a core including
  a plurality of teeth, and
  a wire wound on the plurality of teeth.

34. The compressor of claim 24, wherein the refrigerant is hydrocarbon refrigerant excluding chlorine and fluorine, and the lubricant and the refrigerant are mutually soluble with each other.

35. A refrigerating device comprising:
a compressor as defined in claim 24; and
a refrigerating system through which the refrigerant circulates, the refrigerating system being coupled to the compressor, the refrigerating system including a condenser, a decompressor, and an evaporator.

36. The refrigerating device of claim 35, wherein a time when the compressor starts to operate is a first time after a defrosting operation.

37. A method of controlling a refrigerant compressor, comprising:
starting the compressor,
running the compressor for at least one time period at a high frequency,
running the compressor for at least one time period at a low frequency,
running the compressor at a normal operating frequency,
wherein the compressor is run at a high frequency immediately after starting,
each high frequency period is immediately followed by a low frequency period,
each low frequency period, except for a last low frequency period, is immediately followed by a high frequency period,
the compressor is run at the normal operating frequency immediately after the last low frequency period, and
each high frequency is higher than each low frequency.

38. The method of claim 37, wherein there are a plurality of high frequency time periods and a plurality of low frequency time periods.

39. The method of claim 38, wherein each successive low frequency time period has a shorter duration than each previous low frequency time period, and a longer duration than each high frequency time period.

40. The method of claim 38, wherein a high frequency of each successive high frequency time period is higher than a high frequency of each previous high frequency time period.

* * * * *